L. H. THULLEN.
CIRCUIT CONTROLLING APPARATUS.
APPLICATION FILED JULY 11, 1910.
1,054,653.
Patented Feb. 25, 1913.
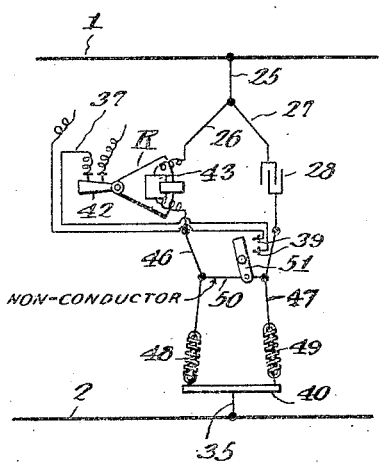
Witnesses:
Inventor:

BEST AVAILABLE COPY

UNITED STATES PATENT OFFICE.

LOUIS H. THULLEN, OF CINCINNATI, OHIO, ASSIGNOR TO THE UNION SWITCH & SIGNAL COMPANY, OF SWISSVALE, PENNSYLVANIA, A CORPORATION OF PENNSYLVANIA.

CIRCUIT-CONTROLLING APPARATUS.

1,054,653.   Specification of Letters Patent.   Patented Feb. 25, 1913.

Original application filed May 16, 1904, Serial No. 208,171. Divided and this application filed July 11, 1910. Serial No. 571,268.

*To all whom it may concern:*

Be it known that I, LOUIS H. THULLEN, a citizen of the United States, residing at Cincinnati, in the county of Hamilton and State of Ohio, have invented certain new and useful Improvements in Circuit-Controlling Apparatus, of which the following is a specification.

The present application is a division of my application, Serial No. 208,171—filed May 16, 1904.

I will describe one form of circuit controlling apparatus embodying my invention and will then point out the novel features thereof in a claim.

Referring to the drawing, 1 and 2 designate conductors forming part of an electric circuit, which circuit may carry two alternating currents differing in frequency. For example, it may have one current of 25 cycles and another current of 60 cycles. These two currents may both be present at the same time, or one of the currents may be present at one time and the other at another time. The sources of current are not shown in the drawing.

46 and 47 are two wires, preferably of small cross sectional area, which wires will respond by longitudinal variations to variations of current therein. These wires are held in tension by springs 48 and 49 respectively, one end of each spring being secured to a fixed block 40 of conducting material, and the other end being connected with one end of one of the wires 46 or 47; it is understood that the upper end of each of the wires is fixed. These wires 46 and 47 and the springs 48 and 49 are connected in multiple across the conductors 1 and 2 by means of wires 25, 26, 27, springs 48 and 49, block 40 and wire 35. Included in the branches of this multiple circuit are means arranged to permit equal currents at one frequency (for example at 25 cycles) and unequal currents at another frequency (for example 60 cycles) to pass through the wires 46 and 47. As here shown these means comprise an inductive winding 43 included in series with wire 46 and a condenser 28 included in series with wire 47. The inductive winding 43 and the condenser 48 are so adjusted that at 25 cycles, the currents through the two branches of the circuit are equal regardless of the voltage, so that at this frequency the longitudinal variations of wires 46 and 47 will be equal. Obviously then, with this adjustment, at 60 cycles the current through the condenser 28 and wire 47 will be greater than that through inductive winding 43 and wire 46 regardless of the voltage, so at this frequency the wire 47 will expand more than the wire 46. A cord 50 of insulating material connects the two conductors 46 and 47 at preferably about their middle points. This cord is also connected to a pivoted member 51, which member opens and closes circuit controlling contacts 39. This cord 50 and member 51, are so arranged that when the longitudinal variations of the wires 46 and 47 are equal (that is at 25 cycles) the member 51 is held in such position that contacts 39 are open. This is the position shown in the drawing. At 60 cycles however, the expansion of wire 47 is greater than that of wire 46, so that wire 47 then permits wire 46 and spring 48 to pull the member 51 to such position as to close the contacts 39.

It will be seen from the foregoing that the circuit controlling apparatus which I have thus far described is responsive to 60 cycle current to close the contacts 39 but is not responsive to 25 cycle current to close these contacts. It is understood however, that these two frequencies are arbitrarily chosen and that the condenser and inductive winding could readily be adjusted to render the apparatus responsive to current of any one frequency and not responsive to current of some other frequency.

With the apparatus as thus far described, if the branch circuit including wire 46 should be me open at any point so that the current through wire 46 was interrupted while wire 47 continued to carry current, the contraction of wire 46 might be sufficient to pull the member 51 to such position as to close contacts 39, even when wire 47 carries only 25 cycle current. To avoid any such possibility, I provide a relay R having an energizing winding connected with the branch circuit including wire 46, so that if the current through this branch should be discontinued for any reason, the contact 42 of relay R will open. As here shown, the energizing winding of the relay R constitutes the inductive winding 43. The contacts 42 of the relay R and the contacts 39 are connected in series so that any circuit controlled by the apparatus will be opened whenever the relay R is open.

A circuit controlling apparatus embodying my invention is particularly adapted for use in railway signaling systems wherein an alternating current of one frequency is used for propulsion current and an alternating current of another frequency is employed in the track circuits to control railway signals. In such cases the propulsion current frequency is generally 25 cycles and the signaling current frequency is generally 60 cycles, so that if a circuit controlling apparatus embodying my invention is used as a track relay for such a system, and is adjusted in the manner in which I have hereinbefore described, the apparatus will be responsive to signaling current to close its contacts but will not be responsive to propulsion current to close its contacts. In such cases it is understood that the conductors 1 and 2 would be track rails of the railway and that the contacts 39 and the contacts 42 of relay R would control a signal circuit either directly or indirectly.

Although I have herein shown and described only one form of circuit controlling apparatus embodying my invention, it is understood that various changes and modifications may be made therein within the scope of the appended claim without departing from the spirit and scope of my invention.

Having thus described my invention, what I claim is:—

In combination, two conductors, means for supporting said conductors under tension, means included in circuit with said conductors for permitting equal currents at one frequency and unequal currents at another frequency to pass through the conductors whereby at the first frequency the longitudinal variations of the conductors are equal and at the other frequency the longitudinal variations are unequal, a contact, a member controlling the contact and operatively connected with each of said conductors and so arranged that at the first-mentioned frequency the member is held in position to open the contact, and that at the second-mentioned frequency the conductor expanding the greater permits the conductor expanding the lesser to pull the said member to close the contact, a relay having an energizing winding connected with the circuit of the last-named conductor, and a circuit controlled by the said contact and by the said relay.

In testimony whereof, I have signed my name to this specification, in the presence of two subscribed witnesses.

LOUIS H. THULLEN.

Witnesses:
F. W. WILLEY,
CHAS. L. TANGEMAN.